3,585,052
HEAT RESISTANT PAINT

Jacob F. Dannewald, Box 327; Albert S. Dannewald, Box 532; and Robert I. Strader, General Delivery, all of Stettler, Alberta, Canada; and Rudolph H. Dannewald, Box 1176, Brooks, Alberta, Canada
No Drawing. Filed Oct. 15, 1968, Ser. No. 767,857
Int. Cl. C09d 1/04
U.S. Cl. 106—84                                    6 Claims

ABSTRACT OF THE DISCLOSURE

A composition for use in forming a heat and flame resistant paint which comprises from about 14 to 19½ parts by weight of finely divided clay, from about 1½ to 2½ parts by weight of finely divided asbestos, from about 14 to 19½ parts by weight of finely divided silica sand or silica flour, from about 18 to 30 parts by weight of soluble glass, from about 5 to 9 parts by weight of red or black iron oxide or white titanium oxide, from about ½ to 1⅔ parts by weight of rosin, and at least about 3½ parts by weight of an aqueous solution containing 50% by weight sodium hydroxide.

---

The present invention relates to a heat and flame resistant coating composition and in particular to a heat and flame resistant paint composition, useful in protecting substrates particularly metal, e.g., steel substrates which are normally subjected to high temperatures from deterioration.

Siliceous compositions for use in rendering substrates fire-proof and in particular for coating substrates such as wood and metal to render them fire-proof are well known. Thus, for example heat and fire resistant compositions for use in rendering substrates such as wood and metal fire proof have been disclosed inter alia in Canadian Pats. Nos. 434,105; 61,570; 683,814; 729,260; 237,347; 231,037; and 129,383 and in U.S. Pats. Nos. 1,074,511; 3,180,146; 3,259,556; 2,893,897; 3,311,585; 3,224,890; 2,938,937; 1,628,171; and 2,593,400.

However, known siliceous compositions which have had commrecial success have relatively low temperature resistance and cannot withstand high temperatures i.e. temperatures greater than about 1,000° F. which limits their usefulness for many industrial applications. Further, these coating compositions have further disadvantages in that some are difficult to apply necessitating, in some cases, the use of primer coating and further others are formulated from expensive ingredients which again limits their commercial application.

The applicants according to the present invention have found that by formulating a siliceous composition from particular ingredients in critical weight ranges it is possible to readily and easily formulate a coating composition which provides a coating or a substrate which is highly resistant to heat and flame and is substantially unaffected by temperatures of the order of 2,000° F. and higher and is also substantially unaffected by a naked flame applied directly thereto.

The present invention thus provides a paint which may be readily formulated from commercially known, relatively inexpensive ingredients by simple mixing, which paint may be applied directly to a substrate, particularly a metal substrate, by simple techniques such as spraying or brushing without any pretreatment of the metal surface other than normal removal of, for example, rust, mill scale, grease and oil or other such dirt from the metal surface to produce on drying a paint coating which is highly resistant to weathering and chemical action under extremes of temperature such that the coating is substantially unaffected at temperatures up to the melting point of the metal substrate and in particular temperatures up to about 3,000° F. and higher. The paint composition of the present invention can be applied to a cold or even a red hot ferrous metal surface to produce a heat and flame resistant coating on the metal surface which coating can withstand a naked flame without appreciable effect such that under a blow torch ferrous metals forming the substrate will melt before the flame will affect the paint. This heat and flame resistance of the coating is such that it is impossible to cut a metal substrate having the coating compositions thereon from the coated side thereof it being only possible to cut it from the uncoated side. Further the coating of the present invention is highly resistant to chemical action particularly of an acidic nature under ambient conditions and conditions of high and low temperatures as set forth above.

According to the present invention therefore there is provided a composition for use in forming a heat and flame resistant coating paint which composition comprises a mixture of from about 14 to 19½ parts by weight of finely divided clay from about 1½ to 2½ parts by weight of finely divided asbestos, from about 14 to 19½ parts by weight of finely divided silica sand or silica flour, from about 18 to 30 parts by weight of water soluble glass, from about 5 to 9 parts by weight of an oxide pigment selected from red or black iron oxide and titanium dioxide, from about ½ to 1⅔ parts by weight of rosin and at least 3½ and preferably from 3½ to 5 parts by weight of an aqueous solution containing 50% by weight sodium hydroxide adapted for said mixture being in admixture with water in an amount sufficient to allow the paint so obtained to be substantially evenly spread on a substrate particularly a metal substrate to form a heat and flame resistant coating thereon.

It is stressed that each and every one of the ingredients of the composition is essential to the paint for without the ingredient in the specified range the paint loses its unique properties of excellent heat and flame resistance to a substantial extent.

Thus, it is essential that the mixture contains finely divided clay in an amount from about 14 to 19½ parts by weight. The clay provides body to the paint and when it is absent the paint has no body and it does not cover properly. Further, with substantially less than about 14 parts by weight of clay the paint is still too weak and does not have enough body. With substantially above about 19½ parts by weight of clay present, the paint is too lean in comparison with the other ingredients, is difficult to handle as it becomes a mud and tends to readily chip off from the substrate. There is no substitute for the clay in the paint as upon the substrate being subjected to high temperatures the clay appears to melt, turn to glass and cling to the substrate whereby the coating resists gaseous odors and apparently seals the substrate against rust. Thus, other silicate materials such a talc when incorporated into the paint in place of the clay cause the paint under the action of heat to form an ash. Again, substitution of calcium carbonate for clay detracts substantially from the heat and flame resistant properties of the paint as it will not stick to a hot surface as apparently does the clay. The clay is in finely divided form to allow for application of the paint to the substrate particularly by spraying and as such suitably has a particle size of not more than 200 mesh.

The finely divided asbestos is also critical to the unique properties of the paint of the present invention for when it is omitted the paint loses its resistance to flame and deteriorates under heat. Thus, the asbestos expands and contracts with the metal forming the substrate and with substantially less than about 1.5 parts of the asbestos the paint is a very brittle paint which will not sufficiently expand and contract and thus readily crack under extreme conditions of temperature. When there is too much asbestos present, i.e. substantially more than .95 part by weight the paint is too soft and too porous and absorbs moisture and tends to readily rub off. Further the asbestos gives the paint an insulating quality which will give other paints that may be used to cover it a better chance to last. It is necessary that the absbestos be in finely divided form, suitably of a particle size of 200 mesh or less, to facilitate application of the paint to the substrate and in particular to allow the paint to be sprayed onto the substrate the fine particle size of the asbestos allowing the paint to pass through the spray machine.

The silica flour which is, for example, fine crushed sand rolled into a powder is also a critical ingredient of the paint composition of the present invention and primarily provides body to the paint and makes it more adhesive under the action of heat. Thus, the silica flour is essential for use in the paint to be applied to a substrate, e.g. a metal substrate that will be subjected to temperatures of up to several thousand degrees Fahrenheit, as at this temperature the silica melts and the paint appears to become a ceramic coating which is almost impossible to remove from the substrate. The silica flour melts under the heat and clings to the surface of the metal and essentially assists the clay which is also present for essentially the same function. The amount of silica flour present depends inter alia upon the quality of the clay and when a poor clay, i.e., one which has a substantial amount of foreign material therein is present then more silica flour is necessary when the silica flour is absent from the paint a glassy surface is not produced on heating which apparently weakens the resistance of the paint to gases, weathering and rusting of a metal substrate. Thus, substantially less than 14 parts by weight of silica flour produces a soft paint which is not durable and substantially more than about 19½ parts by weight of silica flour in the paint makes the paint too brittle and the paint will not expand or contract enough with variation in temperature to be durable. As used herein silica flour is intended to include silica sand.

The soluble glass is essentially ordinary water glass and it is believed that this ingredient which is an essential ingredient is to make the mixture bind together, i.e. it has a tendency to promote the amalgamation of the ingredients, and help in resisting weathering of the substrate. Thus, the soluble glass which is present in an amount from about 18 to 30 parts by weight is present primarily for instant protection of the substrate following the painting of the substrate with the paint and aids in the protection during the subsequent application of heat and flame in a similar manner to the silica flour and the clay. With less than 18 parts by weight of the soluble glass the paint absorbs moisture and the bond to the substrate is relatively poor. Above about 30 parts by weight soluble glass the paint becomes too brittle causing it to check which allows moisture to enter and rust on the substrate.

The pigment, i.e. the red or black iron oxide or the white titanium dioxide are also essential ingredients to the paint of the present invention as in addition to keeping their colour when the paint is applied to a substrate and maintaining that colour under the subsequent conditions applied to the substrate they also strengthen the paint and are essential ingredients chemically for the paint. With other pigments and dyes such as blue, green and yellow oxides there is firstly no clear colour obtained in the paint and further the paint turns powdery under heat, i.e. the strength of the paint deteriorates substantially with these other oxides. Further it is essential that the red or black iron oxide or the white titanium dioxide is present in an amount from about 5 to 9 parts by weight as with substantially lower amounts of the pigment the bright colour is lost and the smoothness of the paint falls off and further with substantially more than 3.6 parts by weight of the pigment the quality of the paint is sacrificed for quantity. Of the above pigments the red iron oxide and the white titanium dioxide are preferable to the black iron oxide.

The rosin which is also an essential ingredient of the present invention is present primarily to make the paint porous and allow the substrate coated with the paint to breath. When the rosin is absent or present in an amount substantially less than 5 parts by weight of the mixture then the paint dries on the substrate into a too dense form and the substrate, i.e. the metal, which may sweat, has difficulty in letting the moisture escape and also hot metal exposed to rain or water causes the paint to pop off in the places where the rain hits. Thus, when too little rosin is present the paint loses its breathing quality and the paint bubbles under heat and flakes off. When substantially too much rosin is put in, i.e. more than about 9 parts by weight the paint deteriorates or is weakened and becomes quite brittle, will blister and appears to turn to ash in the heat. Thus, when applied on a hot surface the paint is liable to blister and chip off. The correct proportion or rosin further helps to hold any other paint that may be applied on top of the paint of the present invention as the paint of the present invention offers a great deal of heat insulation. Applicants have been unable to find any other resinous material which may be substituted for the rosin in the paint of the present invention and in particular incorporation of polyvinyl chloride, asphalt, tar, polyvinyl acetate or butyl rubber in the paint is difficult and causes it to melt under extreme heat.

The aqueous sodium hydroxide is present for a two fold purpose and is also essential to the present invention. The aqueous sodium hydroxide is believed to etch the surface of the substrate, particularly metal substrates, and assist the paint in clinging to the surface of the substrate and at the same time it aids in the mixing of the paint. The aqueous sodium hydroxide etches the substrate during the setting up and drying of the paint to give the surface of the substrate tooth to hold the paint which is particularly advantageous on normally smooth surfaces such as glass, chromium and aluminum surfaces. At the same time in order that the paint may be applied to the substrate for example by spraying onto a substrate it is necessary to make a paste out of the asbestos and the aqueous sodium hydroxide is essential for this purpose. In the formation of the paint, the asbestos is admixed with the aqueous sodium hydroxide to form a paste of the asbestos breaking down the asbestos fibre before it is mixed with the remaining ingredients. With substantially less than 3½ parts by weight of the aqueous sodium hydroxide there is insufficient cleaning and etching of the substrate for holding the paint to the metal sufficiently well and about 4 parts by weight of the aqueous gives the substrate enough etch or tooth to hold the paint extremely well. There is no advantage to be gained by increasing the aqueous sodium hydroxide content above about 5 parts by weight. Sodium hydroxide does not deteriorate the heat and flame resistant properties of the paint. Other alkali metal hydroxides are not useful in the paint as for example potassium hydroxide decomposes when exposed to oxygen and lithium hydroxide is not readily compatible with the other ingredients of the paint. Further, with potassium or lithium hydroxide present in the paint, the paint under heat turns to chalk or flakes and comes off the substrate.

The water is present in the paint purely as a carrier for applying the paint to the substrate and the water evaporates off as the paint dries in the substrate. The amount of water thus depends upon whether the paint is to be applied with the brush or sprayed or dipped. When there is too much water present the paint will sag and run and when there is insufficient water present the paint cannot be applied evenly enough especially when sprayed onto the substrate. Suitably the water is present in an amount of at least about 45% by weight of the aforesaid mixture for brushing application of said paint but for spraying and dipping application with water is desirable.

In formulating the paint of the present invention it is necessary to mix the sodium hydroxide and the asbestos to form a paste which paste is then mixed with the clay and pigment oxide and subsequently with the remaining ingredients of the paint. Thus, the paint of the present invention may be readily prepared from conventional ingredients in a simple manner and the paint may be then applied to the substrate and in particular a metal substrate such as a steel substrate by conventional techniques such as spraying, brushing or dipping. However, the present invention is not limited to the use of the paint upon metal substrates as it is also useful for the protection of other surfaces such as glass, wood surfaces and may be applied either to a cold or a hot surface at relatively low or extremely high temperatures without their being any deterioration in the paint. Thus, the present invention provides a paint which can be applied conventionally to surfaces particularly metallic surfaces such as chrome, aluminum and steel surfaces, and allowed to dry which paint protects such surfaces against extremes of heat is resistant to direct flame and further prevents rust forming on the metal and provides heat insulation. The paint is also resistant to chemicals normally of a corrosive nature such as hydrogen sulfide and in particular the paint of the present invention is so flame resistant that it can withstand a naked flame without effect over a period of hours and the metal is highly heat resistant and in fact a metal substrate will melt without effecting the paint, the paint being substantially completely heat resistant up to temperatures of 3,000° C. without showing any appreciable effect. Further, if it is desired to cut the metal substrate it is impossible to cut the metal from the painted side and the blow torch has to be applied to the uncoated side of the metal.

The present invention will be further illustrated by way of the following example.

EXAMPLE 1

A paint was made up having the following formulation, 16 oz. of finely divided kaolin, pipestone or potters clay having a particle size of not more than 200 mesh, 2 oz. of finely divided asbestos having a particle size of not more than 200 mesh, 16 oz. of silica flour, 20 oz. of soluble glass, 6 oz. of red iron oxide, 4 oz. of an aqueous solution containing 50% by weight sodium hydroxide, 1 oz. of rosin and 26 oz. of water. The paint was made up by admixing the asbestos with the sodium hydroxide to form a paste, then mixing the paste with the clay and the red iron oxide and finally mixing the mixture so obtained with the other ingredients of the paint. The paint so obtained can be used directly or be stored over a substantial period of months and only needs agitation before application. However, on storage the paint must be stored in non-metallic containers as the paint tends to destroy the metal.

The paint so obtained was sprayed on a red hot ferrous metal surface with no appreciable deterioration in the paint and the paint took a naked flame without appreciable effect. Further, under a blow torch the ferrous metal melted without the flame affecting the paint. Thus when the ferrous metal substrate coated with the paint was hung in front of a naked flame for six hours and was contacted for an additional six hours with the flame of a blow torch there was no appreciable effect shown on the paint. When the metal was cut with a welding torch it was found by the welder that he could not cut the metal by attempting to cut from the painted side but it was only possible to cut it on the opposite side, i.e. the unpainted side. There was no metal preparation needed before applying the paint to the metal and it was found that the paint protected the metal from 800° F. to the melting point of the metal. When the aforesaid paint was sprayed onto the surface of the metal in a gas plant at a temperature increasing up to the melting point of the metal there was no apparent effect upon the paint. Further, the paint has been used approximately for three years on an experimental basis on metal substrates where the temperature varied from 1,200° F. to 2,000° F. without the paint being affected.

The aforesaid paint was used to paint a hot process piping and vessels in the fractionation building of a gas plant which was subjected to 375° F. under hydrogen sulfide environment and after a year there was no discoloration, blistering or deterioration of the paint.

Several steam turbines of a local gas plant were painted with the aforesaid paint which paint was subjected to temperatures of up to 600° F. and also exposed to hot water, steam, crude oil, gas and sulfur fumes, the steam turbines being kept over a period of two years and the paint showed no deterioration other than stains left by the sulfur and the soda in the water.

The paint has been used in oil treater plants with great success. A part of a chimney on a crude oil treater was painted with the aforesaid paint. The furnace of this oil treater was fired by gas and turned on and off automatically. In about 20 minutes the chimney became red hot for a vertical distance of about 4 ft. and the furnace may run for about 1 and ½ hours and then automatically shut off again and in about 20 to 30 minutes was as cold as the temperature outside which may get as low as 20° C. below zero. This was repeated day after day and the aforesaid paint has been substantially unaffected over a period of 30 months even though the equipment is not housed and is thus exposed to snow, sleet, rain and wind during which time it is turning from red hot to ice cold.

In a local power plant the aforesaid paint was used to paint uninsulated bare metal which is exposed to all the elements, which equipment is used for holding fly ash and stored until it cools off where it is shipped to cement factories for use in cement. During the cooling the metal bins are red hot for hours and the paint has been substantially unaffected even after a period of 3 years. The paint was found to be a slate colour and application of a knife thereto would barely scratch the surface of the paint.

The aforesaid paint was also used on the exhaust pipes of compressor engines that are run on gas. These engines are 500 H.P. and compressed the gas several thousand pounds per square inch the exhaust pipes being 16 inches in diameter and remain at a fairly even temperature of about 2,000° F. After 20 months the paint was still hardening, the engines running the whole year round and are only stopped for overhaul which only happens about once a year.

When in the aforesaid paint the amount of clay was reduced by 2 oz. and the paint was applied to a substrate by dipping or spraying and the substrate heated to red hot and submerged in cold water the paint showed fine cracks in the surface but still stuck tightly to the substrate. When the amount of clay was increased by over 3½ oz. the paint was found to chip off quite easily when struck with a screwdriver.

When in the above paint the silica flour was reduced for 2 oz. and applied to the substrate by dipping or spraying then heated to red hot and submerged in cold water the paint showed fine cracks in the surface but still stuck tightly, the cracking being slightly less than with the reduced amount of clay referred to above. With the amount of silica flour increased by over 3½ oz. the paint became more brittle, showed cracks and again was quite easy to chip off.

When the iron oxide was reduced by an ounce it was found that the paint applied to the substrate was not as strong but still stuck fairly tightly to the substrate and when the iron oxide was increased by over 3 oz. the paint became softer and absorbed more moisture and when submerged in water lost some of its colour.

When the amount of rosin in the above paint was decreased to less than ½ oz. the paint stayed softer and also more dense and further when it was increased to more than 3 oz. the paint blistered on being subjected to the aforesaid heating and formed bubbles on the surface when submerged and broke open.

The sodium hydroxide when reduced to less than ½ oz. was insufficient to etch the metal properly of the substrate for good tooth and further did not adequately break up the asbestos during mixing making spraying with ordinary equipment difficult. Increasing the amount above 5 oz. did not show too much effect to the naked eye.

With regard to the asbestos reducing the amount of this to less than ½ oz. in the paint it was found that the paint had substantially less heat resistance and when the asbestos was increased over 2½ oz. it was found that the paint absorbed a substantial amount of moisture and rubbed off quite easily.

With less than about 2 oz. of soluble glass the paint was found to absorb moisture and the bond to the substrate was relatively poor and when the amount of soluble glass was increased to over 30 oz. the paint became brittle and checked which allowed moisture to enter the paint and rust the metal substrate. The above tests were done by dipping, brushing or spraying the paint onto the substrate and then heating the substrate until it was red hot with a propane torch, and while still red hot dipping the heated substrate into cold water. The expanded metals, i.e. strips of iron, were contracted in seconds by lowering the temperature and the above effects were obtained.

It will be readily seen that the paint of the present invention is highly resistant to chemicals, extremes of temperature and naked flames and is far superior to any other commercially available paint for use in protecting substrates particularly metallic substrates such as steel substrates.

We claim:

1. A composition for use in forming a heat and flame resistant paint which consists essentially of from about 14 to 19½ parts by weight of finely divided clay, from about 1½ to 2½ parts by weight of finely divided asbestos, from about 14 to 19½ parts by weight of a siliceous material selected from the group consisting of finely divided silica sand and silica flour, from about 18 to 30 parts by weight of soluble glass, from about 5 to 9 parts by weight of a pigment selected from the group consisting of red or black iron oxide and white titanium oxide, from about ½ to 1⅔ parts by weight of rosin, and at least about 3½ parts by weight of an aqueous solution containing 50% by weight sodium hydroxide.

2. A composition as claimed in claim 1 in which the aqueous sodium hydroxide is present in an amount from 3½ to 5 parts by weight.

3. A composition as claimed in claim 1 consisting essentially of about 16 parts by weight finely divided clay, about 16 parts by weight silica flour, about 6 parts by weight red iron oxide, about 1 part by weight rosin, about 2 parts by weight asbestos, about 20 parts by weight soluble glass and about 4 parts by weight of an aqueous solution containing 50% by weight sodium hydroxide.

4. A composition as claimed in claim 1 in which the pigment is red iron oxide.

5. A composition as claimed in claim 1 in which the pigment is white titanium dioxide.

6. A composition as claimed in claim 1 in which the finely divided clay has a particle size of not more than 200 mesh.

References Cited
UNITED STATES PATENTS

| 2,162,387 | 6/1939 | Radabaugh | 106—84 |
| 2,261,260 | 11/1941 | Kraus | 106—84 |
| 3,389,002 | 6/1968 | Huffcut | 106—84 |

JAMES E. POER, Primary Examiner

U.S. Cl. X.R.

106—83